(12) United States Patent
Amin et al.

(10) Patent No.: US 9,429,075 B2
(45) Date of Patent: *Aug. 30, 2016

(54) METHOD OF OPERATING A FUEL HEATING SYSTEM

(71) Applicant: General Electric Company, Schenectady, NY (US)

(72) Inventors: Rushi Mahesh Amin, Greenville, SC (US); Douglas Scott Byrd, Greer, SC (US); Dean Matthew Erickson, Simpsonville, SC (US); Michael John Mariani, Greer, SC (US); Christina Renee Pompey, Simpsonville, SC (US); Korey Frederic Rendo, Greer, SC (US); Bryan Edward Sweet, Valatie, NY (US)

(73) Assignee: General Electric Company, Schenectady, NY (US)

(*) Notice: Subject to any disclaimer, the term of this patent is extended or adjusted under 35 U.S.C. 154(b) by 741 days.

This patent is subject to a terminal disclaimer.

(21) Appl. No.: 13/755,434

(22) Filed: Jan. 31, 2013

(65) Prior Publication Data
US 2014/0208766 A1    Jul. 31, 2014

(51) Int. Cl.
*F02C 7/224*    (2006.01)
*F02C 7/26*    (2006.01)

(52) U.S. Cl.
CPC ........ *F02C 7/224* (2013.01); *F02C 7/26* (2013.01)

(58) Field of Classification Search
CPC ............ F02C 4/224; F02C 3/34; F02C 7/26; F01D 25/12; F01D 21/12
See application file for complete search history.

(56) References Cited

U.S. PATENT DOCUMENTS

| | | | | |
|---|---|---|---|---|
| 3,675,426 A * | 7/1972 | Vidal | ........... | F01K 23/103 60/39.182 |
| 5,845,481 A | 12/1998 | Briesch et al. | | |
| 5,899,073 A * | 5/1999 | Akimaru | ........... | F02C 3/22 60/39.465 |
| 6,082,095 A * | 7/2000 | Akimaru | ........... | F02C 3/22 60/39.465 |
| 6,578,362 B1 * | 6/2003 | Coffinberry | ........... | F02C 7/12 60/730 |
| 7,134,284 B2 * | 11/2006 | Lohn | ........... | F02C 3/22 60/39.465 |
| 8,015,793 B2 | 9/2011 | Austin et al. | | |
| 8,534,073 B2 * | 9/2013 | Garcia-Crespo | ........... | F02C 3/34 60/39.52 |
| 8,677,729 B2 * | 3/2014 | Bilton | ........... | F02C 7/14 60/39.5 |
| 2009/0235634 A1 * | 9/2009 | Wang | ........... | F02C 7/047 60/39.182 |
| 2011/0146290 A1 * | 6/2011 | Vernet | ........... | F01D 19/00 60/778 |
| 2011/0221422 A1 * | 9/2011 | Gonder | ........... | F02C 7/266 324/76.11 |
| 2014/0102071 A1 * | 4/2014 | Ball, Jr. | ........... | F02C 7/224 60/39.52 |
| 2014/0102105 A1 * | 4/2014 | Janapaneedi | ........... | F02C 3/34 60/736 |
| 2014/0298816 A1 * | 10/2014 | Rendo | ........... | F02C 7/224 60/772 |

* cited by examiner

*Primary Examiner* — Carlos A Rivera
(74) *Attorney, Agent, or Firm* — Ernest G. Cusick; Hoffman Warnick LLC

(57) ABSTRACT

A method of operating a fuel heating system is provided. The method includes performing pre-ignition diagnostic checks on a plurality of components of the fuel heating system, wherein at least one inlet damper and at least one outlet damper of an exhaust flow circuit are each in a closed position. The method also includes purging the fuel heating system of unburned hydrocarbons. The method further includes operating the fuel heating system in a normal operating condition. The method yet further includes operating the fuel heating system in a cool down condition, wherein the at least one inlet damper is in the closed position.

20 Claims, 3 Drawing Sheets

METHOD OF OPERATING A FUEL HEATING SYSTEM

BACKGROUND OF THE INVENTION

The subject matter disclosed herein relates to gas turbine engines, and more particularly to a method of operating a fuel heating system for such gas turbine engines.

The temperature of fuel consumed by a gas turbine engine is generally required to be within a specific range for efficient combustion associated with the gas turbine engine. Generally, fuel supplied to the gas turbine engine is not heated, such that a fuel heater is employed to increase the temperature of the fuel to meet the aforementioned temperature requirements for combustion. The fuel heater requires an energy source for operation and the energy source is considered a parasitic load on the gas turbine engine.

A method of heating the fuel may include employing heated exhaust generated by the gas turbine engine that is otherwise discharged to the ambient environment. Such a method may include inefficiencies and safety issues based on the extensive number components and the complexity of control systems, as well as the combustible nature of the fuel being heated.

BRIEF DESCRIPTION OF THE INVENTION

According to one aspect of the invention, a method of operating a fuel heating system is provided. The method includes performing pre-ignition diagnostic checks on a plurality of components of the fuel heating system. The method also includes purging the fuel heating system of an accumulation of unburned hydrocarbons. The method further includes operating the fuel heating system in a normal operating condition, wherein the at least one inlet damper, the at least one outlet damper and at least one recirculation damper are each in an open position. The method yet further includes operating the fuel heating system in a cool down condition, wherein the at least one inlet damper is in the closed position.

According to another aspect of the invention, a method of operating a fuel heating system is provided. The method includes performing pre-ignition diagnostic checks on a plurality of components of the fuel heating system. The method also includes purging the fuel heating system of an accumulation of unburned hydrocarbons. The method further includes operating the fuel heating system in a normal operating condition. The method yet further includes operating the fuel heating system in a cool down condition. The method also includes operating the fuel heating system in a shutdown condition. The method further includes monitoring the fuel heating system, wherein the fuel heating system initiates at least one protective mode upon detection of an abnormal operating characteristic.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
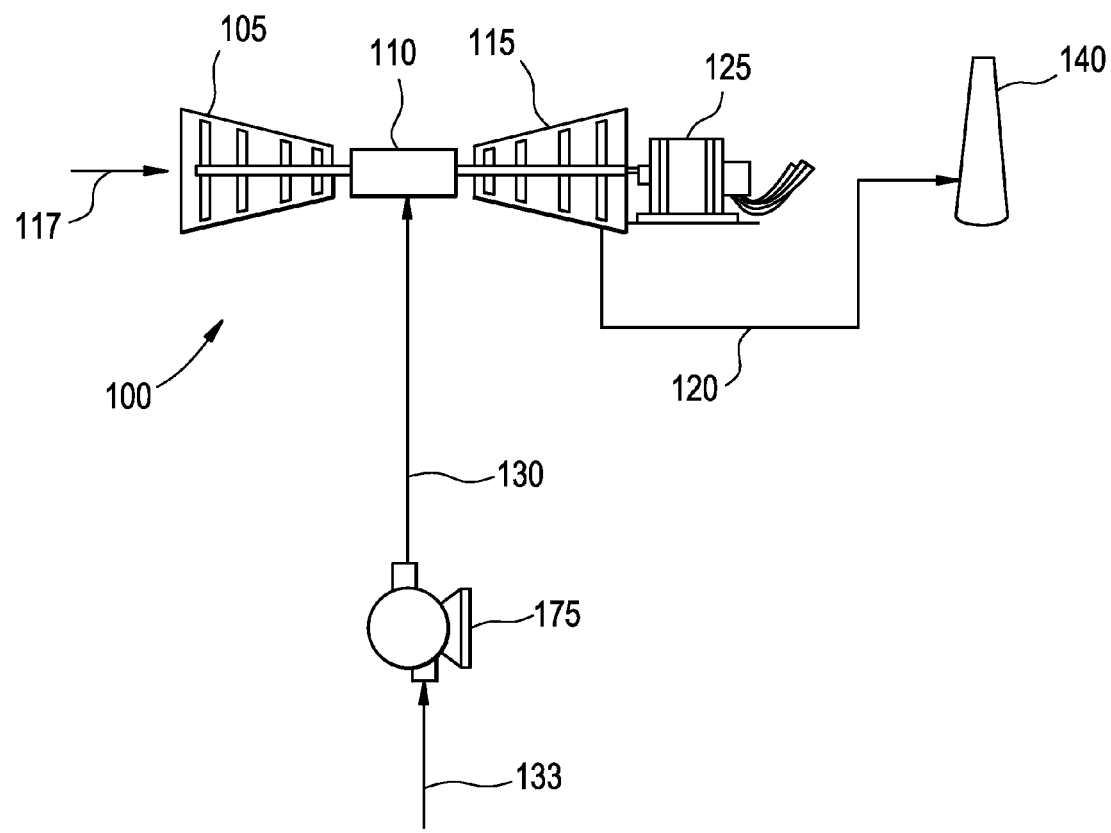
FIG. 1 is a schematic illustration of a gas turbine engine.

Referring to FIG. 1, a gas turbine engine 100 is schematically illustrated and shown in a simple cycle configuration. The gas turbine engine 100 generally comprises a compressor 105, a combustion system 110, and a turbine section 115. An exhaust stack 140 may be located downstream of the turbine section 115.

Generally, the compressor 105 receives and compresses an inlet air, represented by an arrow 117. The compressed air may flow downstream to the combustion system 110, where the compressed air is mixed with a fuel 130, such as, but not limited to, a natural gas. The energy released during the combustion process flows downstream and drives the turbine section 115. A load, such as, but not limited to, a generator 125 may be coupled to the gas turbine engine 100. Here, the mechanical torque generated in the turbine section 115 is converted to electrical energy. An exhaust air 120 generated during operation of the gas turbine engine 100 discharges through the exhaust stack 140.

The gas turbine engine 100 may receive the fuel 130 from a fuel supply 133. The fuel supply 133 originates proximate a location where the fuel 130 is supplied to the site via a fuel compressor 175 and eventually flows to the combustion system 110. As noted above, some gas turbine engines require heated fuel for performance and/or other reasons. Here, a parasitic load, such as, but not limited to, a fuel heater 185 (FIG. 2) heats the fuel 130 to the desired operating range.

Figure 2:
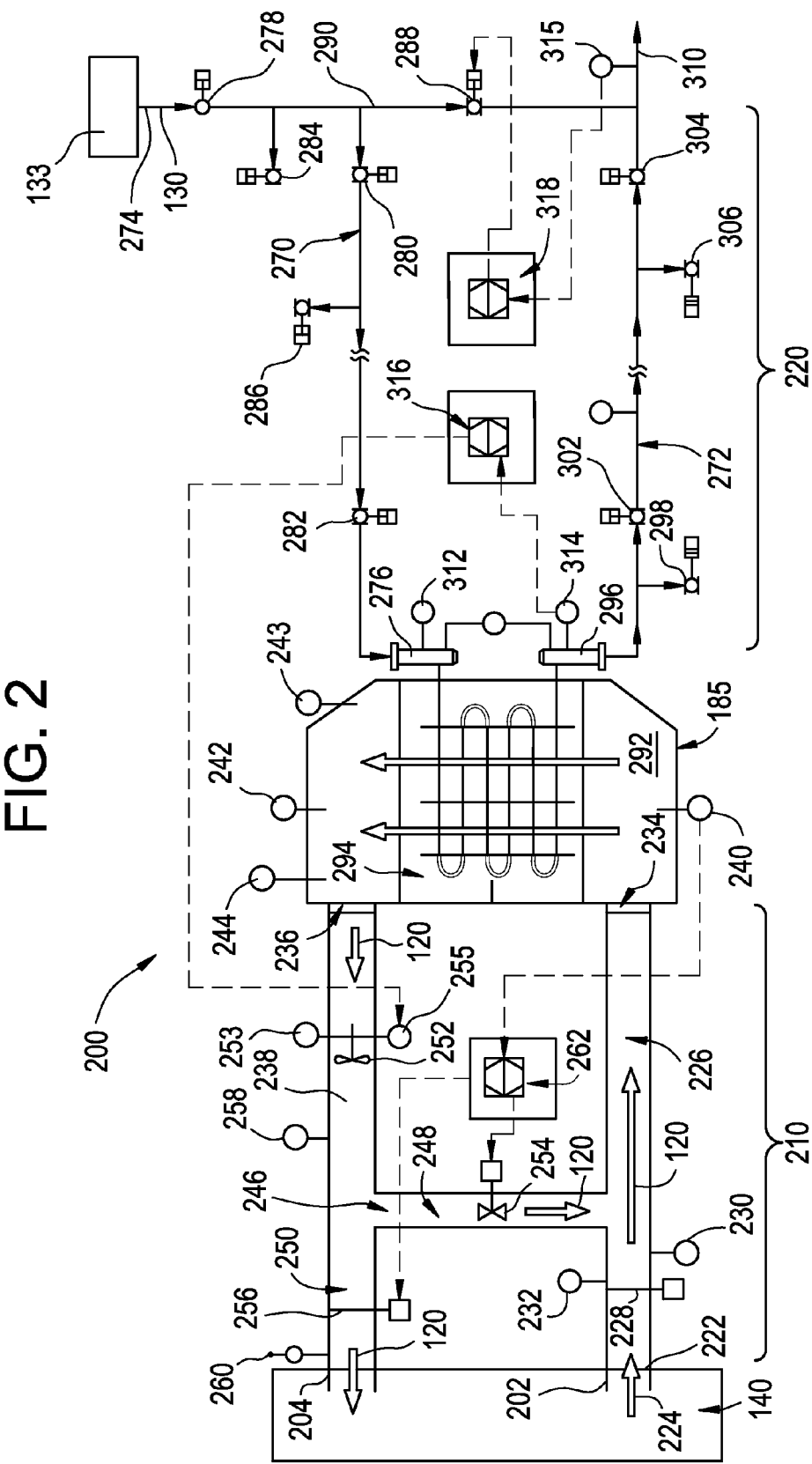
FIG. 2 is a schematic illustration of a fuel heating system used in conjunction with the gas turbine engine.

Referring now to FIG. 2, a fuel heating system 200 is schematically illustrated. The fuel heating system 200 comprises an exhaust flow circuit 210, the fuel heater 185, and a fuel flow circuit 220, each of which will be discussed in detail below.

As discussed above, the embodiment illustrated may apply to the gas turbine engine 100 operating in a simple cycle mode. Therefore, for the purposes of this discussion, the exhaust air 120 begins at the exhaust stack 140 It is to be appreciated that extraction of the exhaust air 120 doesn't necessarily need to come off of the exhaust stack 140. It can be any point from the outlet of the gas turbine engine 100 to the discharge to the atmosphere. The exhaust stack 140 may comprise a cylindrical shape with an opening at the top. Operationally, the exhaust stack 140 allows the exhaust air 120 to discharge into the atmosphere. The exhaust stack 140 may also comprise a stack penetration 202 that is configured to divert a portion of the exhaust air 120 from flowing out of the exhaust stack 140 and into the exhaust flow circuit 210 of the fuel heating system 200. In one embodiment, the stack penetration 202 may divert a large portion of the exhaust air 120 to the exhaust flow circuit 210. In an alternate embodiment, the stack penetration 202 may divert up to about 10% of the exhaust air 120 to the exhaust flow circuit 210. The exhaust stack 140 may also comprise a stack return 204 that includes structure configured to channel the exhaust air 120 from a discharge of the fuel heater 185 to the exhaust stack 140.

The fuel heater 185 operatively transfers heat from the exhaust air 120 to the fuel 130. The fuel heater 185 may be fluidly connected downstream of the stack penetration 202. An embodiment of the fuel heater 185 comprises an exhaust inlet 222 proximate the stack penetration 202 for allowing an incoming exhaust airflow 224 to enter the exhaust flow circuit 210 along an exhaust supply path 226. Disposed proximate the exhaust inlet 222 is at least one, but typically a plurality of exhaust inlet dampers 228 for controlling the amount of the exhaust air 120 that enters the exhaust flow circuit 210 as the incoming exhaust airflow 224. Proximate the plurality of exhaust inlet dampers 228 is an exhaust air inlet thermocouple 230 for detecting an inlet temperature of the incoming exhaust airflow 224 and at least one methane detector, such as a first methane detector 232, for detecting the presence and quantity of fuel or unburned hydrocarbons.

The fuel heater 185 includes a fuel heater inlet 234 for receiving the exhaust air 120 and a fuel heater outlet 236 for expelling the exhaust air 120 to an exhaust return path 238 of the exhaust flow circuit 210. At least one heater inlet thermocouple 240 may be disposed proximate the fuel heater inlet 234. Additionally, at least one heater outlet thermocouple 242, as well as another methane detector, such as a second methane detector 243, and at least one, but typically an array of flame detection thermocouples 244, may be disposed proximate the fuel heater outlet 236.

To facilitate flowing of the exhaust air 120 throughout the exhaust flow circuit 210, a fluid circulation device 252 is disposed within the exhaust flow circuit 210. In the illustrated embodiment, the fluid circulation device 252 is disposed downstream of the fuel heater outlet 236, but it is contemplated that the fluid circulation device 252 may be located at an alternate location. The fluid circulation device 252 comprises a blower, a fan, or other prime moving device. The fluid circulation device 252 may be driven by a motor 255 of the variable frequency or constant frequency type. Another of at least one methane detector, such as a third methane detector 258, is disposed proximate the fluid circulation device 252 and blower bearing vibration detection 253 is in communication with the fluid circulation device 252 for detecting vibration levels proximate the fluid circulation device 252.

Subsequent to expulsion of the exhaust air 120 from the exhaust return path 238, the exhaust air 120 is routed to a junction 246 configured to route the exhaust air 120 to a recirculation path 248 and an outlet path 250. The routed ratio of the exhaust air 120 to the recirculation path 248 and the outlet path 250 is controlled by at least one, but typically a plurality of recirculation dampers 254 and at least one, but typically a plurality of exhaust outlet dampers 256, disposed within the recirculation path 248 and the outlet path 250, respectively. At least one, but typically a plurality of exhaust air outlet thermocouples 260 for detecting an outlet temperature of the exhaust air 120 is located proximate the plurality of exhaust outlet dampers 256.

A first controller 262 is in operative communication with the at least one heater inlet thermocouple 240, the plurality of recirculation dampers 254, and the plurality of exhaust outlet dampers 256. The first controller 262 is configured to maintain the temperature of the exhaust air 120 detected by the heater inlet thermocouple 240 proximate the fuel heater inlet 234. This is achieved by controlling the plurality of recirculation dampers 254 and the plurality of exhaust outlet dampers 256. Temperature control proximate the fuel heater inlet 234 is a result of mixing of exhaust air 120 flowing through the recirculation path 248 with the incoming exhaust airflow 224 at a location upstream of the heater inlet thermocouple 240. In one embodiment, the first controller 262 comprises a proportional-integral-derivative controller (PID controller). The first controller 262 calculates a difference between a desired temperature of the exhaust air 120 and an actual temperature detected by the heater inlet thermocouple 240. Based on the calculated difference, the plurality of recirculation dampers 254 and the plurality of exhaust outlet dampers 256 are adjusted, when necessary.

The fuel flow circuit 220 moves the fuel 130 through the fuel heater 185 and comprises a fuel supply path 270 and a fuel discharge path 272. The fuel supply path 270 extends from proximate a fuel inlet 274 disposed proximate the fuel supply 133 to a fuel inlet port 276 of the fuel heater 185 for fluid coupling between the fuel supply path 270 and the fuel heater 185. The supply of the fuel 130 to the fuel supply path 270 is controlled by a stop valve 278 located proximate the fuel inlet 274. The fuel 130 supplied to the fuel supply path 270, and flowing therein, is typically unheated. Along the fuel supply path 270 is at least one, but typically a plurality of fuel supply path isolation valves. In the exemplary embodiment, a first fuel supply path isolation valve 280 and a second fuel supply isolation valve 282 are included. One or more vent valves are included along the fuel supply path 270. In the illustrated embodiment, a first valve 284 is disposed upstream of the first fuel supply path isolation valve 280 and a fuel supply path vent valve 286 is located between the first fuel supply path isolation valve 280 and the second fuel supply path isolation valve 282.

A fuel mixing valve 288 is included along a connecting path 290 that fluidly couples the fuel supply path 270 and the fuel discharge path 272. In one embodiment, the fuel mixing valve 288 comprises a two way valve, which may be controlled to a specific valve position. The fuel mixing valve 288 may be employed to bypass the fuel heater 185 in operating conditions not involving the flow of the fuel 130 to the fuel heater 185, or may act as a mixing valve to mix the unheated fuel with fuel heated by the fuel heater 185. In the mixing operation, control of the fuel mixing valve 288 maintains a target fuel temperature of the fuel 130 prior to entering the combustion system 110 of the gas turbine engine 100. Control of the fuel mixing valve 288 will be discussed in greater detail below.

In an exemplary embodiment, the fuel heater 185 comprises a heat exchanger having physically separate compartments. A convection compartment 292 may allow the exhaust air 120 to flow therethrough, while a fuel compartment 294 may allow the fuel 130 to flow through it. The convection compartment 292 is designed to provide a uniformity of flow across the fuel compartment 294. The fuel compartment 294 comprises a tube bundle design and the integrity of the tube bundle construction prevents the mixing of exhaust gas with the fuel. As illustrated, the second compartment 294 may comprise a tube path configured to route the fuel 130 through the fuel heater 185 for a sufficient time duration to achieve desired heating of the fuel 130 while flowing therein. As the exhaust air 120 flows over the second compartment 294, the fuel 130 is heated.

The fuel 130 is routed to the fuel discharge path 272 via a fuel outlet port 296 that fluidly couples the fuel heater 185 and the fuel discharge path 272. A heater vent valve 298 is located downstream of the fuel heater 185 and is configured to vent the fuel heater 185 of the fuel 130 in the event that rapid venting of the fuel heater 185 is necessary. Downstream of the heater vent valve 298 is a first fuel discharge path isolation valve 302 and a second fuel discharge path isolation valve 304. Disposed between the first fuel discharge path isolation valve 302 and the second fuel discharge path isolation valve 304 is a fuel discharge path vent valve 306. The fuel discharge path 272 extends from the fuel outlet port 296 to a fuel flow circuit outlet 310 that is fluidly coupled to the combustion system 110 of the gas turbine engine 100.

At least one fuel inlet port thermocouple 312 is located proximate the fuel inlet port 276 of the fuel heater 185 for temperature detection of the fuel 130 prior to heating of the fuel 130 within the fuel heater 185. Similarly, at least one fuel outlet port thermocouple 314 is located proximate the fuel outlet port 296 for temperature detection of the fuel 130 subsequent to heating of the fuel 130. Additionally, a mixed fuel thermocouple 315 is disposed proximate the fuel flow circuit outlet 310 for detecting the temperature of the fuel 130 just prior to flowing to the combustion system 110 of the gas turbine engine 100.

A second controller 316 is in operative communication with the fuel outlet port thermocouple 314 and the fluid circulation device 252. The second controller 316 is configured to maintain the temperature of the fuel 130 proximate the fuel outlet port 296 at a desired temperature. This is achieved by controlling the flow rate of the exhaust air 120 throughout the fuel heater 185, and more specifically over the fuel compartment 294 containing the fuel 130. As with the first controller 262, the second controller 316 may comprise a proportional-integral-derivative controller (PID controller).

A third controller 318 is in operative communication with the mixed fuel thermocouple 315 and the fuel mixing valve 288. The third controller 318 is configured to maintain the temperature of the fuel 130 proximate the fuel flow circuit outlet 310 at a desired temperature. This is achieved by controlling the positioning of the fuel mixing valve 288, thereby controlling the amount of unheated fuel that is mixed with the heated fuel. As with the first controller 262 and the second controller 316, the third controller 318 may comprise a proportional-integral-derivative controller (PID controller).

Figure 3:
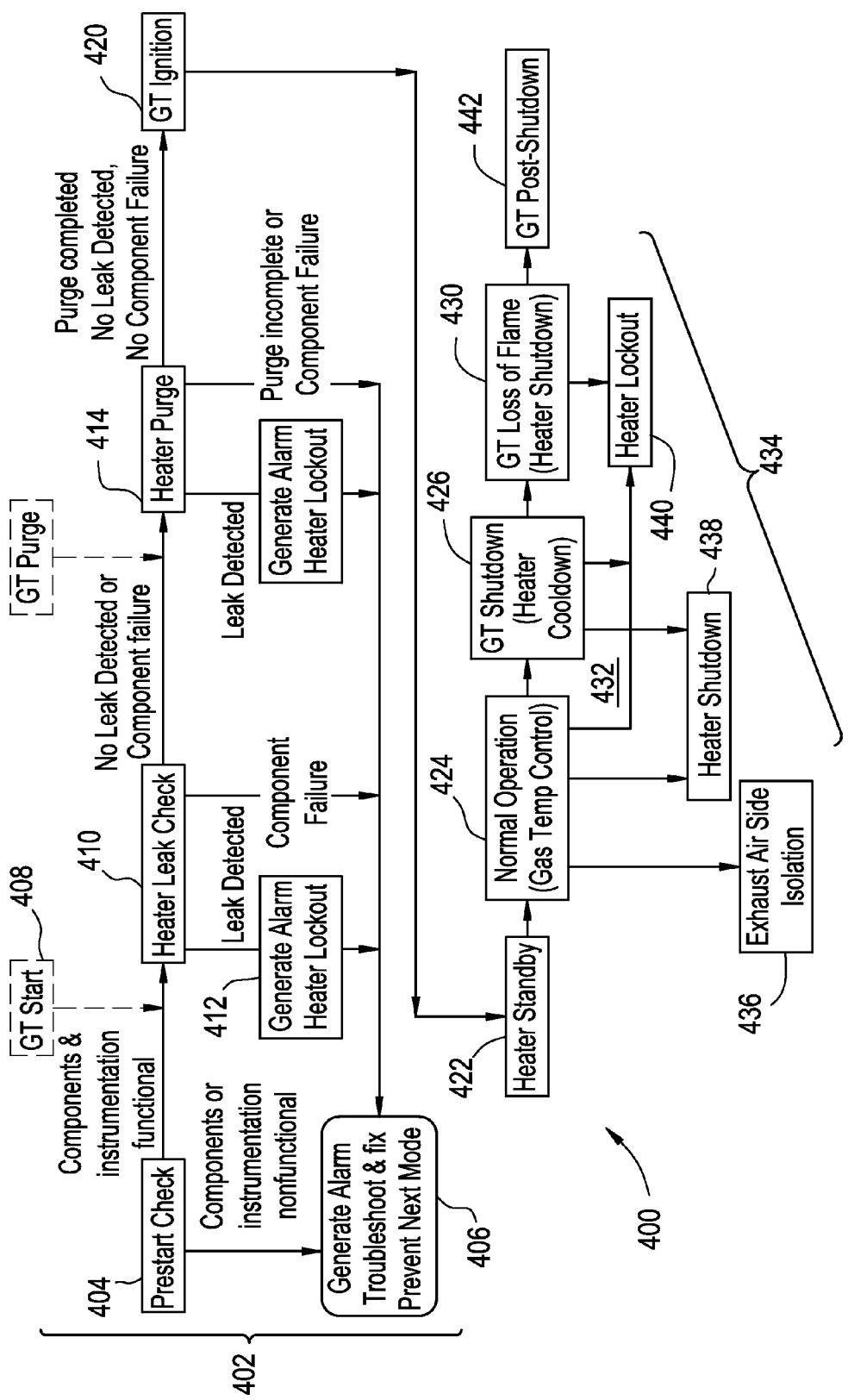
FIG. 3 is a flow diagram illustrating a method of operating the fuel heating system.

Referring now to FIG. 3, in conjunction with FIGS. 1 and 2, a method of operating 400 the fuel heating system 200 is illustrated with a flow diagram. Several operating modes and protective modes are illustrated. Generally categorized, the modes may be grouped as pre-start/pre-ignition modes, gas turbine operating and shutdown modes, and protective modes.

The method of operating 400 includes performing a pre-ignition diagnostic check 402 that includes a pre-start check of a plurality of components 404 of the fuel heating system 200. The components checked include any of the components discussed in detail above, such as valves, dampers, and instrumentation, for example. An alarm is signaled 406 in the event that the pre-start check of a plurality of components 404 indicates that any of the components are not functioning adequately. Upon signaling of such an alarm, the next mode of operation is prevented and troubleshooting is initiated. However, if the components satisfactorily complete the diagnostic check, the gas turbine engine is started 408 and a heater leak check is performed 410. Specifically, the vent valves 284, 286, 298, 306 are closed, the stop valve 278 is opened, while the isolation valves of the fuel supply path 270 and the fuel discharge path 272 of the fuel flow circuit 220 are opened. Such a configuration allows the fuel 130 to pressurize and flow throughout the fuel flow circuit 220 and the fuel heater 185.

The plurality of exhaust inlet dampers 228 and the plurality of exhaust outlet dampers 256 are each in a closed position, while the plurality of recirculation dampers 254 is positioned in an open position to allow the exhaust air 120 to flow throughout the exhaust flow circuit 210. The exhaust air 120 is encouraged to flow with the use of the fluid circulation device 252 operating. In one embodiment, the fluid circulation device 252 operates at a minimum operating speed. The fuel mixing valve 288 is typically closed during the heater leak check and the methane detectors ensure that no methane is detected, which would indicate a heater leak. The heater leak check is performed 410 for a predetermined time to satisfactorily determine that a leak is not present. If a leak is determined, an alarm is generated 412 and a protective mode is initiated, which may correspond to a heater lockout. Additionally, if there is any device failure or abnormal vibration or temperatures, the system is prevented from moving on to the next operating mode. The various protective modes will be discussed in detail below.

The fuel heating system purge 414 is initiated upon a satisfactory completion of the heater leak check and gas turbine purge. During the purging, "clean" air is directed through the fuel heater 185 to remove any unburned hydrocarbons. The fuel flow circuit 220 remains pressurized with fuel supply 130. Additionally, the plurality of exhaust inlet dampers 228 is opened to a fully opened position, while the plurality of exhaust outlet dampers 256 and the plurality of recirculation dampers 254 are each opened to a partially opened position. Typically, the plurality of exhaust outlet dampers 256 is opened a greater extent than the plurality of recirculation dampers 254. In one embodiment, the plurality of exhaust dampers 256 is positioned to allow about 75% of the exhaust air 120 to flow therethrough to the exhaust stack 140, while the plurality of recirculation dampers 254 is opened to allow about 25% of the exhaust air 120 to be recirculated. While the fuel heating system is purged 414, the isolation valves remain open and the fuel mixing valve 288 remains closed. The fuel heating system 200 continues to monitor for a fuel leak, component failures, and/or abnormal operation, any of which triggers an alarm and action, such as a heater lockout, for example, in the case of a leak. If any of the methane detectors 243 or 258 indicate presence of methane and/or unburned hydrocarbons above the protective limit, the system will initiate an alarm and take action to lockout the heater.

Upon satisfactory completion of the pre-ignition diagnostic checks, the gas turbine engine can be ignited 420 and, in one embodiment, the fuel heating system 200 enters a heater standby mode 422 when the gas turbine is ignited. In the heater standby mode 422, the plurality of exhaust outlet dampers 256 is positioned in the closed position, while the plurality of recirculation dampers 254 is positioned in a fully opened position. The fuel heating system 200 operates in this mode until the gas turbine engine 100 reaches a predetermined shaft speed, which varies depending on the application. In one embodiment, the shaft speed is less than about 30%.

Alternatively, the heater standby mode 422 may be bypassed completely and the fuel heating system 200 may enter a normal operating condition 424 immediately or shortly after the gas turbine engine is ignited 420. Operation of the fuel heating system 200 in the normal operating condition 424 has been described in detail above in conjunction with the description of the fuel heating system 200, such that duplicative discussion of the operation of each component is not necessary. In the normal operating condition 424, the plurality of exhaust inlet dampers 228, the plurality of exhaust outlet dampers 256, and the plurality of recirculation dampers 254 are all each typically in the open position to allow the incoming exhaust airflow 224 to be routed to the exhaust flow circuit 210, as well as for recirculation and discharge of the exhaust air 120 after flowing through the fuel heater 185. As described in detail above, the first controller 262 is configured to control the plurality of recirculation dampers 254 and the plurality of exhaust outlet dampers 256 to regulate the temperature of the exhaust air 120 entering the fuel heater 185, as detected by the inlet thermocouple 240. Additionally, the second controller 316 is configured to regulate the temperature of the fuel 130 exiting the fuel heater 185 at discharge 296 by controlling the fluid circulation device 252. The third controller 318 is configured to control the temperature of the mixed fuel exiting the fuel flow circuit 220 to the gas turbine engine 100 by manipulating the positioning of the fuel mixing valve 288. It is to be understood that although the embodiment described above employs multiple controllers, it is feasible that a single controller may be employed to carry out embodiments.

After a shutdown of the gas turbine engine, the fuel heating system 200 is operated in a cool down condition 426. This condition may occur once the speed of the gas turbine engine 100 decreases below a predetermined speed, such as below 95% max speed, for example. While being operated in a cool down condition 426, the plurality of exhaust inlet dampers 228 is positioned in a closed position to prevent additional exhaust air from entering the exhaust flow circuit 210 from the exhaust stack 140. The plurality of recirculation dampers 254 is opened a greater extent than the plurality of exhaust outlet dampers 256 to route a majority of the exhaust air 120 through the recirculation path 248. In the cool down condition, the fuel mixing valve 288 is moved to the closed position if it had been in an open position during operation in the steady state condition. Additionally, the fluid circulating device 252 continues to operate, but typically at a reduced speed.

The fuel heating system 200 is operated in a shutdown condition 430 once the gas turbine engine 100 is in a flameout state. In the shutdown condition, the plurality of exhaust inlet dampers 228 remain closed, while the plurality of exhaust outlet dampers 256 and the plurality of recirculation dampers 254 are each partially opened. In one embodiment, the plurality of exhaust outlet dampers 256 and the plurality of recirculation dampers 254 are opened to a position configured to allow an equal amount of the exhaust air 120 to flow through each. The isolation valves are closed, but the fuel mixing valve 288 and the isolation vents are opened. Additionally, the fluid circulation device 252 is turned off once the temperature of the exhaust air 242 is below about 200° F. (about 93.3° C.), in one embodiment.

The method of operating 400 the fuel heating system 200 includes monitoring the fuel heating system 432 for various operating abnormalities that may pose safety or efficiency issues. Upon detection of such an operating abnormality, at least one protective mode is initiated 434.

A first protective mode is referred to as an exhaust flow circuit isolation mode 436. In this mode, the plurality of exhaust outlet dampers 256 is closed and the fluid circulation device 252 is operated at a relatively low speed, so that additional heat in the form of the exhaust air 120 is not pulled from the exhaust stack 140, but allowing enough of the exhaust air 120 to flow within the exhaust flow circuit 210, thereby ultimately cooling the fuel heater 185 with unheated fuel flowing through the second compartment 294 of the fuel heater 185. Also in this mode, the fuel mixing valve 288 is closed to allow all of the unheated fuel to pass through the fuel heater 185. This mode may be applied when there is a desire or need to provide unheated fuel to the gas turbine. Additionally, this mode may be applied if there is a component fault that does not negatively impact safety, but requires correction prior to continued heater operation.

A second protective mode is referred to as a heater shutdown mode 438. In addition to the measures taken in the exhaust flow circuit isolation mode 436, the fuel 130 is contained within the fuel heater 185 as a result of bypassing and bottling up the fuel heater 185. Bypass is achieved by opening the fuel mixing valve 288, closing isolation valves (280, 282, 302, 304). Bottling up the heater is achieved by opening the vents 286, 306 disposed within the fuel supply path 270. The heater vent valve 298 remains closed to prevent venting of the fuel heater 185. This mode is triggered when a non-severe condition or component fault/failure occurs, such as valve fault, which prevents the continuous operation of the heater.

A third protective mode is referred to as a heater lockout mode 440. The heater lockout mode 440 is employed for a severe condition, such as a fuel leak or a fire in the fuel heater 185. In this mode, both the exhaust flow circuit 210 and the fuel flow circuit 220 are isolated as described in the previous protective modes, but the fuel heater 185 is also vented by opening heater vent valve 298. Additionally, all isolation valves are closed and all vents valves are opened.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating a fuel heating system, the fuel heating system including an exhaust flow circuit configured to heat a fuel flow circuit having at least one inlet damper, at least one outlet damper, and at least one recirculation damper, the method comprising:
    performing pre-ignition diagnostic checks on a plurality of components of the fuel heating system, wherein, during the performing of the pre-ignition diagnostic checks, the at least one inlet damper and the at least one outlet damper are each in a closed position;
    purging the fuel heating system of an accumulation of unburned hydrocarbons;
    operating the fuel heating system in a normal operating condition; and
    operating the fuel heating system in a cool down condition, wherein, during the operating of the fuel heating system in the cool down condition, the at least one inlet damper is in the closed position,
    wherein the at least one inlet damper controls an amount of exhaust air that enters the exhaust flow circuit via a supply path, the at least one outlet damper controls an amount of exhaust air that exits the exhaust flow circuit via an outlet path, and the at least one recirculation damper controls an amount of exhaust air that is recirculated in the exhaust flow circuit from the outlet path to the supply path via a recirculation path.

2. The method of claim 1, wherein the performing of the pre-ignition diagnostic checks further comprises diagnostically checking a plurality of valves and a plurality of dampers prior to starting a gas turbine engine in communication with the fuel heating system.

3. The method of claim 1, further comprising performing a fuel leak check of a fuel heater with at least one methane detection device.

4. The method of claim 3, further comprising opening the at least one recirculation damper to the open position during the performing of the fuel leak check, wherein the performing of the fuel leak check is conducted subsequent to starting a gas turbine engine in communication with the fuel heating system.

5. The method of claim 3, further comprising opening an isolation valve for allowing a flow of a fuel from a fuel supply arrangement to the fuel heater, for pressurization of the fuel heater.

6. The method of claim 1, further comprising opening the at least one inlet damper to the open position and opening both of the at least one outlet damper and the at least one recirculation damper to a partially open position during purging of the fuel heating system.

7. The method of claim 6, further comprising extracting an exhaust air as an incoming exhaust airflow of a gas turbine engine for flowing of the exhaust air over a fuel heater of the fuel heating system, wherein a fluid circulation device at least partially facilitates flowing of the exhaust air throughout the exhaust flow circuit.

8. The method of claim 1, wherein the operating the fuel heating system in the normal operating condition is conducted subsequent to ignition of a gas turbine engine in communication with the fuel heating system.

9. The method of claim 8, wherein the operating the fuel heating system in the normal operating condition comprises:
  extracting an exhaust air as an incoming exhaust airflow from an exhaust stack by opening the at least one inlet damper;
  recirculating the exhaust air for mixing with additional incoming exhaust airflow by opening the at least one recirculation damper; and
  expelling the exhaust air to the exhaust stack by opening the at least one outlet damper, wherein the at least one recirculation damper and the at least one outlet damper regulate an inlet temperature of the exhaust air proximate the at least one inlet damper.

10. The method of claim 1, wherein a fluid circulation device at least partially facilitates flowing of an exhaust air throughout the exhaust flow circuit.

11. The method of claim 1, wherein operating the fuel heating system in the normal operating condition further comprises flowing a fuel from a fuel supply disposed proximate a fuel flow circuit inlet through a fuel heater to a fuel flow circuit outlet for delivery of heated fuel to a gas turbine engine.

12. The method of claim 11, further comprising controlling a fuel mixing valve for selectively routing a portion of unheated fuel from the fuel supply to the fuel flow circuit outlet for mixing of unheated fuel with heated fuel.

13. The method of claim 1, wherein operating the fuel heating system in the cool down condition further comprises routing an exhaust air through the exhaust flow circuit, wherein the exhaust air is routed through the recirculation path controlled by the at least one recirculation damper and the outlet path controlled by the at least one outlet damper.

14. The method of claim 13, further comprising opening the at least one recirculation damper a greater extent than the at least one outlet damper for routing a majority of the exhaust air through the recirculation path.

15. The method of claim 13, further comprising closing a fuel mixing valve configured to selectively route a portion of unheated fuel from a fuel supply from proximate a fuel flow circuit inlet to a fuel flow circuit outlet.

16. The method of claim 1, further comprising operating the fuel heating system in a shutdown condition, wherein the at least one inlet damper is in the closed position and the at least one outlet damper and the at least one recirculation damper are each in a partially open position.

17. A method of operating a fuel heating system, the fuel heating system including an exhaust flow circuit configured to heat a fuel flow circuit having at least one inlet damper, at least one outlet damper, and at least one recirculation damper, the method comprising:
  performing pre-ignition diagnostic checks on a plurality of components of the fuel heating system;
  purging the fuel heating system of an accumulation of unburned hydrocarbons;
  operating the fuel heating system in a normal operating condition;
  operating the fuel heating system in a cool down condition;
  operating the fuel heating system in a shutdown condition, wherein, during the shutdown condition, the at least one outlet damper and the at least one recirculation damper are each opened to a position that allows an equal amount of the exhaust air to flow through the at least one outlet damper and at least one recirculation damper; and
  monitoring the fuel heating system, wherein the fuel heating system initiates at least one protective mode upon detection of an abnormal operating characteristic,
  wherein the at least one inlet damper controls an amount of exhaust air that enters the exhaust flow circuit via a supply path, the at least one outlet damper controls an amount of exhaust air that exits the exhaust flow circuit via an outlet path, and the at least one recirculation damper controls an amount of exhaust air that is recirculated in the exhaust flow circuit from the outlet path to the supply path via a recirculation path.

18. The method of claim 17, wherein the at least one protective mode comprises isolating the exhaust flow circuit from a heat source for cooling down a fuel heater, wherein isolating the exhaust flow circuit comprises:
  closing one of: the at least one inlet damper or the at least one outlet damper; and
  closing a fuel mixing valve configured to selectively route a portion of unheated fuel from a fuel supply from proximate a fuel flow circuit inlet to a fuel flow circuit outlet.

19. The method of claim 18, wherein the at least one protective mode further comprises isolating the fuel heater from the fuel flow circuit, wherein isolating the fuel heater from the fuel flow circuit comprises:
  closing at least one fuel isolation valve configured to control fuel flow from the fuel supply to the fuel heater; and
  opening the fuel mixing valve.

20. The method of claim 19, further comprising opening a heater vent valve for venting fuel from the fuel heater.

* * * * *